United States Patent [19]

Hendricks

[11] 4,073,060
[45] Feb. 14, 1978

[54] POTATO SPIRAL CUTTER

[76] Inventor: Leonard Monroe Hendricks, 1350 E. Main St., Houma, La. 70360

[21] Appl. No.: 637,476

[22] Filed: Dec. 3, 1975

[51] Int. Cl.² .............................................. B26B 3/04
[52] U.S. Cl. .................................... 30/279 R; 30/300
[58] Field of Search .................... 30/279 R, 282, 300, 30/310; 83/856, 652, 6, 425.1, 591, 698

[56] References Cited

U.S. PATENT DOCUMENTS 3,211,202  10/1965  Mason .............................. 83/425.1

FOREIGN PATENT DOCUMENTS 21,138 of  1893  United Kingdom .................. 83/856

Primary Examiner—Gary L. Smith
Assistant Examiner—Roscoe V. Parker

[57] ABSTRACT

A hand held potato spiraler is disclosed having a handle, a blade extending parallel to the handle, a plurality of cutter bars extending perpendicular to and between the blade and handle, and a spike having an auger extending perpendicularly from the base of the blade and the handle for pulling the potato into the blade and cutter bars for cutting long spiral ribbons from said potato.

1 Claim, 6 Drawing Figures

FIG. 1
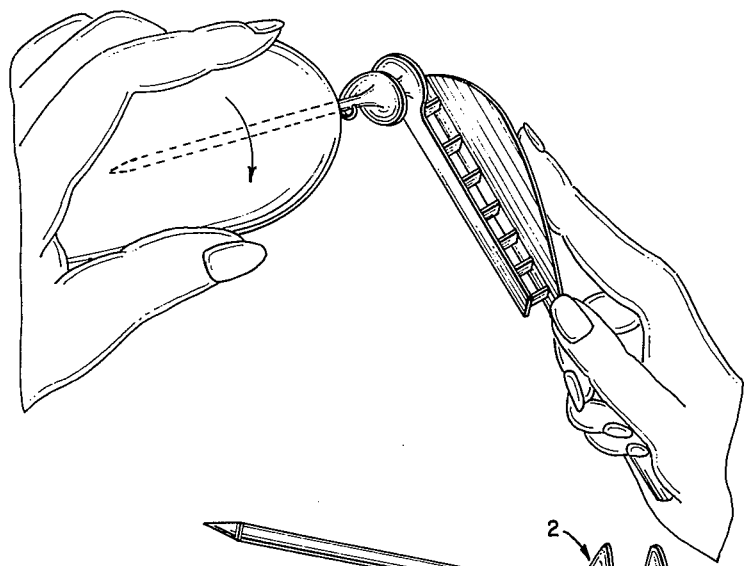
FIG. 5
FIG. 4
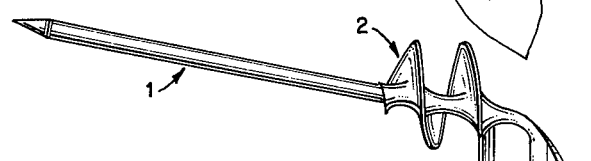
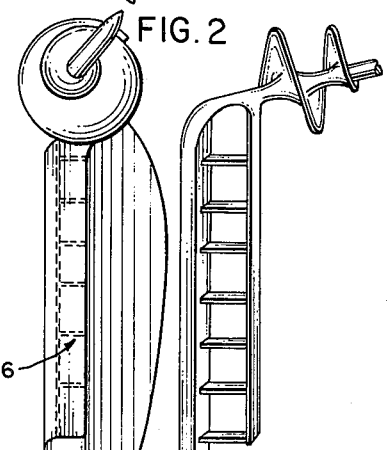
FIG. 2
FIG. 3
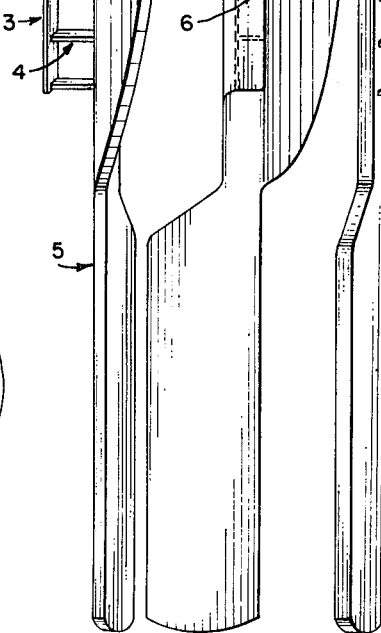
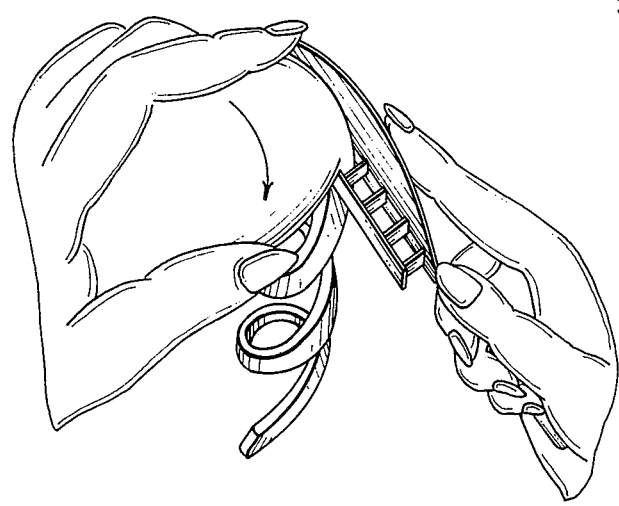
FIG. 6

POTATO SPIRAL CUTTER

The purpose of my invention is to enable a person to cut, with a hand held device, long spiral ribbons from a potato for the purpose of frying crisply and without waste, as the potato need not be peeled, only washed.

The potato spiraler is simple, has no moving parts and is therefore easily cleansed.

FIG. 1 shows the back side,

FIG. 2 the front side. #6 in FIG. 2 indicates the position of the cutters in this view.

FIG. 3 is the left side,

FIG. 4 is the right. #5 in FIG. 4 indicates the handle.

FIG. 5 demonstrates how the device and the potato are held in the hand and how the potato is impaled on the guide spike and the direction of rotation.

FIG. 6 shows the operation of the device and the ribbons being cut from the potato.

The potato spiraler consist of a guide spike approximately 4 inches long ⅛ inch in diameter (#1 in FIG. 4) at the base of which is an augar, approximately ¾ inch in diameter, attached so that the spike is angled approximately 10° from perpendicular to the blade and handle, (#2 in FIG. 4) that will pull the potato which has been impaled on the spike (as shown in FIG. 5) into the blade (#3 in FIG. 4) and cutters (#1 FIG. 4) as the vegetable is rotated in a clockwise direction as indicated in FIGS. 5 and 6, the cutters and blade simultainously disecting the potato completely into long spiral ribbons approximately ¼ inch square.

I claim:

1. A device for cutting long spiral ribbons approximately ¼ inch square from a potato, said device is constructed of steel or similar material and consists of a handle to which are attached a blade, very thin, approximately 3 inches long, ¼ inch wide, parallel to the handle and cutter bars, also thin approximately ⅛ inch wide, ¼ inch long, perpendicular to the handle and seperated from each other by a distance of approximately ¼ inch being evenly spaced and placed with one end attached to the handle and the other attached to the blade with the sharp edge facing the same direction as the sharp edge of the blade, a guideing spike attached to the end of the blade and handle, which is opposite the end held in the hand, at an angle approximately 10° from perpendicular and including a driving augar attached to the base of the spike, whereby when said spike is inserted in a potato the potato is pulled into the blade and cutter which will simultaneously disect the potato into ¼ inch spiral ribbons.

* * * * *